United States Patent
Nikles

(10) Patent No.: US 9,023,304 B2
(45) Date of Patent: May 5, 2015

(54) COMPOSITION, SYSTEM, AND METHOD FOR ABATEMENT OF AIRBORNE CONTAMINANTS

(71) Applicant: John A. Nikles, Findlay, OH (US)

(72) Inventor: John A. Nikles, Findlay, OH (US)

( * ) Notice: Subject to any disclaimer, the term of this patent is extended or adjusted under 35 U.S.C. 154(b) by 0 days.

(21) Appl. No.: 14/489,535

(22) Filed: Sep. 18, 2014

(65) Prior Publication Data

US 2015/0078974 A1    Mar. 19, 2015

Related U.S. Application Data

(60) Provisional application No. 61/879,174, filed on Sep. 18, 2013.

(51) Int. Cl.
*A61L 9/00* (2006.01)
*A61L 9/14* (2006.01)

(52) U.S. Cl.
CPC .................................... *A61L 9/145* (2013.01)

(58) Field of Classification Search
CPC ............. A61L 9/14; A61L 9/00; A61L 9/145; A61L 2209/10
USPC .................................................. 422/120, 123
See application file for complete search history.

(56) References Cited

U.S. PATENT DOCUMENTS

| | | | |
|---|---|---|---|
| 5,371,209 A | 12/1994 | Shieh et al. | |
| 5,874,067 A | 2/1999 | Lucas et al. | |
| 6,033,679 A | * 3/2000 | Woo et al. ..................... | 424/401 |
| 6,436,442 B1 | 8/2002 | Woo et al. | |
| 2001/0026771 A1 | 10/2001 | Trinh et al. | |
| 2002/0168286 A1 | 11/2002 | Demeyere et al. | |
| 2002/0182184 A1 | 12/2002 | Pearl et al. | |
| 2003/0035748 A1 | 2/2003 | Trinh et al. | |
| 2005/0148544 A1 | 7/2005 | Uchiyama et al. | |
| 2009/0170744 A1 | 7/2009 | Meine et al. | |
| 2011/0070181 A1 | 3/2011 | Williams et al. | |

FOREIGN PATENT DOCUMENTS

| | | |
|---|---|---|
| CN | 101032629 A | 9/2007 |
| DE | 102005018238 B4 | 11/2006 |
| DE | 202007004426 U1 | 5/2007 |
| JP | S6446466 A | 2/1989 |

OTHER PUBLICATIONS

Spectrochim Acta A Mol Biomol Spectrosc. Mar. 2004; 60 (4): 815-20.

* cited by examiner

*Primary Examiner* — Timothy Vanoy
(74) *Attorney, Agent, or Firm* — Fraser Clemens Martin & Miller LLC; Jacob M. Ward

(57) ABSTRACT

A composition, system, and method for abatement of airborne contaminants employ an aqueous solution of cyclodextrin and a preservative. The system includes a low shear mixer for introducing the aqueous solution to a contaminated air stream by laminar flow. The system also may have a separator for removing by high shear agitation a contaminant from the aqueous solution following its use, for purposes of recycling the cyclodextrin. The composition, system, and method are particularly useful for treatment of an indoor atmosphere in which the contaminant is a monocyclic aromatic hydrocarbon such as styrene.

20 Claims, 4 Drawing Sheets

```
100 ─ PROVIDING CONTAMINATED
        AIR STREAM
            │
102 ─ INTRODUCING CYCLODEXTRIN TO
        CONTAMINATED AIR STREAM
        UNDER LOW SHEAR, LAMINAR FLOW
            │
        COLLECTING COMPLEXED CYCLODEXTRIN -
        GUEST (CONTAMINANT)  ─ 104
            │
106 ─ SEPARATING CYCLODEXTRIN
        FROM GUEST USING HIGH
        SHEAR AGITATION
            │
   ┌────────┴────────┐
COLLECTING      110 ─ COLLECTING
CYCLODEXTRIN          GUEST
108
```

FIG. 2

COMPOSITION, SYSTEM, AND METHOD FOR ABATEMENT OF AIRBORNE CONTAMINANTS

CROSS-REFERENCE TO RELATED APPLICATIONS

This application claims the benefit of U.S. Provisional Application No. 61/879,174, filed on Sep. 18, 2013. The entire disclosure of the above application is hereby incorporated herein by reference.

FIELD

The disclosure generally relates to a system and method for removing airborne contaminants from an environment and, in particular, a system and method of using cyclodextrin for abatement of airborne monocyclic aromatic hydrocarbons.

BACKGROUND

Airborne contaminants including organic volatiles are a considerable problem of modern society. Exposure to airborne monocyclic aromatic hydrocarbons such as styrene, benzene, toluene, xylene, etc. is especially concerning, due the detrimental affect of these monocyclic aromatic hydrocarbons on the long term health of persons exposed. In fact, occupational exposure to monocyclic aromatic hydrocarbons is believed to increase the risk of a person developing degenerative disorders of the nervous system and certain cancers.

Styrene, in particular, may be emitted from industrial production and usage processes, motor vehicle operation, combustion processes, building materials, and consumer products, resulting in indoor air pollution in production environments. Estimated atmospheric industrial styrene emissions reported to Environmental Protection Agency in 2005 totaled 47.3 million pounds, with more than 38 million pounds released from point sources and more than 10 million pounds released as fugitive emissions. It is also widely believe that the total air emissions of styrene are probably greater than those reported.

Typical sources of industrial styrene emissions are those facilities producing styrene, polystyrene, other plastics, synthetic rubber, and resins. Emissions of styrene from building materials (carpets, floor tiles, and insulation), office copiers, and consumer products (disinfectants, plastics, paint, cigarettes) may also contribute significantly to indoor air pollution.

The principal route of styrene exposure for the general population is by inhalation of contaminated indoor air. Indoor air levels of styrene can be attributed to emissions from building materials, consumer products, and tobacco smoke. It should be pointed out that the workplace or home office may have substantially higher levels of airborne styrene, due to emissions from laser printers and photocopiers. The industries with the highest potential exposure are the reinforced plastics factories, boatbuilding facilities, and polystyrene factories. Exposure may also be high in areas near major spills. Exposure to styrene from hazardous waste sites is potentially important, but the magnitude of the problem is unknown.

There is a continuing need for a system and method for abatement of airborne contaminants including monocyclic aromatic hydrocarbons. Desirably, the system and method facilitates the removal of the airborne contaminants from an indoor atmosphere, is cost effective, and permits for a collection of the airborne contaminants for reuse.

SUMMARY

In concordance with the instant disclosure, a system and method for abatement of airborne contaminants including monocyclic aromatic hydrocarbons, which facilitates the removal of the airborne contaminants from an indoor atmosphere, is cost effective, and permits for a collection of the airborne contaminants for reuse, is surprisingly discovered.

In one embodiment, a composition for abatement of airborne contaminants includes an aqueous solution of cyclodextrin and a preservative.

In another embodiment, a system for abatement of airborne contaminants includes a low shear fluid mixer, a collector, and a high shear separator. The low shear fluid mixer is in communication with a contaminated air stream and a stream of the composition. The fluid mixer is configured to mix the contaminated air stream and the composition using laminar flow. The composition is configured to complex with and removes a contaminant from the contaminated air stream to provide a cleaned air stream. The collector is in communication with the fluid mixer. The collector is configured to separate the cleaned air stream from the abatement composition following the removal of the contaminant with the abatement composition. The high shear separator is in communication with the collector, and configured to separate the contaminant from the composition.

In a further embodiment, a method for abatement of airborne contaminants includes the step of introducing the abatement composition to a contaminated air stream under low shear conditions. The abatement composition is mixed with the contaminated air stream using laminar flow. Subsequent to the mixing of the abatement composition with the contaminated air stream, the clean air stream is separated from the abatement composition. The abatement composition having the contaminant is then collected, and may be further processed with high shear agitation to separate the contaminant from the abatement composition.

In an illustrative embodiment, the disclosure includes a composition, system and method for removing airborne monocyclic aromatic hydrocarbons or AMAH (e.g., styrene, benzene, toluene, xylene, etc.) from the air. The composition is an aqueous solution of cyclodextrin and a preservative. In a preferred embodiment, the composition is a mixture of water with beta-cyclodextrin (soluble to approximately 1.85% at 25° C.) and sodium benzoate. Alpha-cyclodextrin and gamma-cyclodextrin forms may also be used as the cyclodextrin. Another type of preservative that may be used is ascorbic acid.

In operation, the dissolved cyclodextrin in the composition complexes with AMAH from the air under low shear. The cyclodextrin-AMAH complex generally precipitates and can then be collected. The cyclodextrin can be recycled through application of high shear agitation to cause a separation of the cyclodextrin from the AMAH. The cyclodextrin may then be reintroduced into the composition for further removal of AMAH from the air. It is envisioned that the composition and method may be particularly useful in manufacturing environments where AMAH may be regulated.

DRAWINGS

The above, as well as other advantages of the present disclosure, will become readily apparent to those skilled in the art from the following detailed description, particularly when considered in the light of the drawings described hereafter.

FIG. 2 is a flow diagram illustrating a method for abatement of airborne contaminants according to one embodiment of the disclosure;

DETAILED DESCRIPTION

Figure 1:
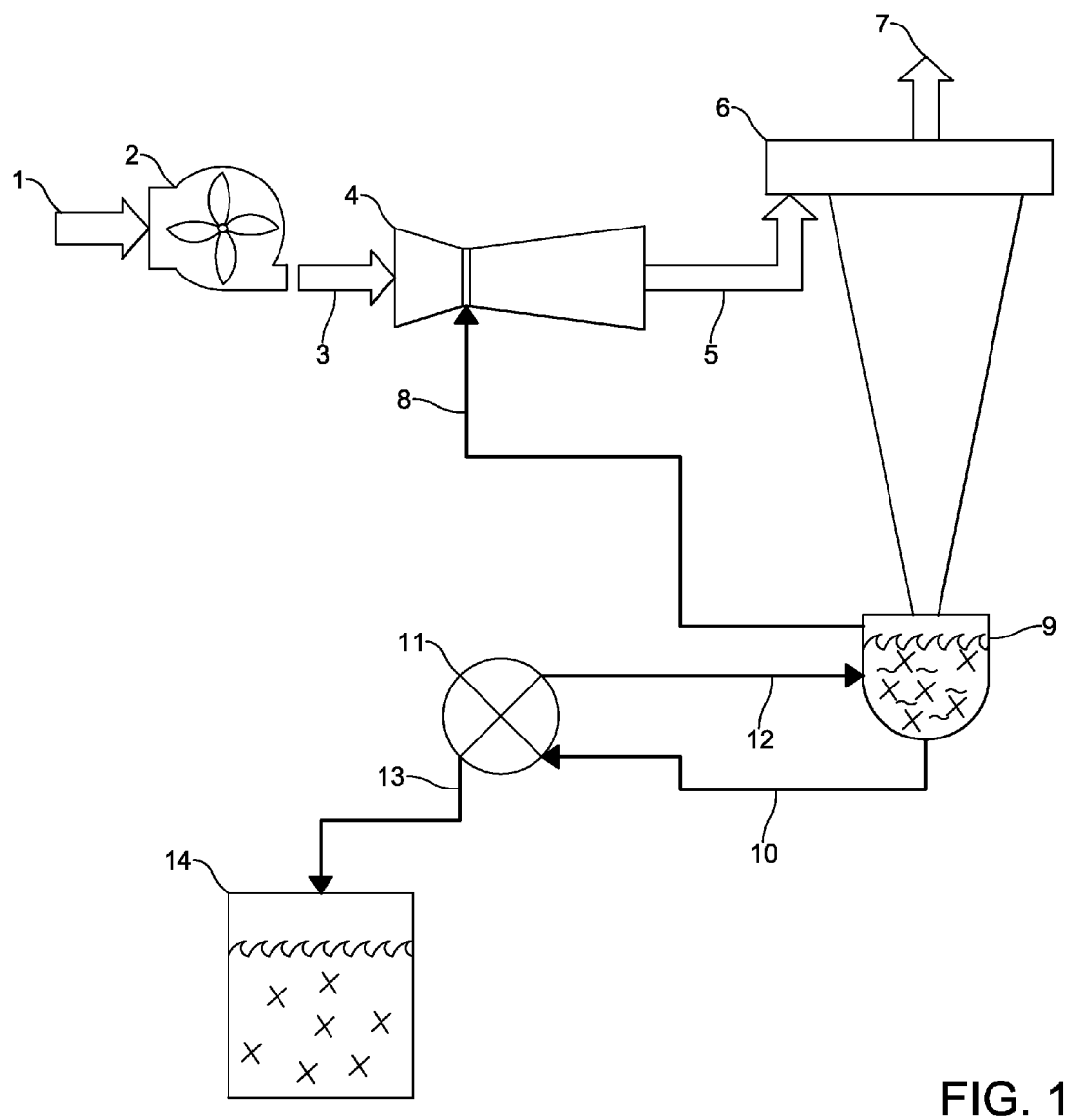
FIG. 1 is a schematic diagram illustrating a system for abatement of airborne contaminants according to one embodiment of the disclosure.

The following description is merely exemplary in nature and is not intended to limit the present disclosure, application, or uses. It should also be understood that throughout the drawings, corresponding reference numerals indicate like or corresponding parts and features. In respect of the methods disclosed, the order of the steps presented is exemplary in nature, and thus, is not necessary or critical.

The system and method as shown in FIGS. 1-4 employs a composition for abatement of airborne contaminants. The composition includes an aqueous solution of cyclodextrin and a preservative. Cyclodextrin is a molecule made from a starch digest of *bacillus macerans*. The natural occurring forms are alpha cyclodextrin (containing 6 dextrin or glucopyranose units), beta cyclodextrin (containing 7 dextrin or glucopyranose units), and gamma cyclodextrin (containing 8 dextrin or glucopyranose units). Other cyclodextrin molecules containing from 9 to 20 dextrin or glucopyranose units.

All natural occurring cyclodextrins are practically non-toxic due to their lack of absorption from the gastrointestinal tract. This makes the water based solutions and slurries safe for use in industrial plants. One particularly suitable type of cyclodextrin is commercially available as CAVAMAX® W7 from Wacker Chemie AG. Although the naturally occurring cyclodextrin are primarily discussed herein, it should be appreciated that other, non-naturally occurring types of cyclodextrin may also be used within the scope of the disclosure.

The cyclodextrins have a unique shape (like a torus) which if enlarged enough would appear like a basketball hoop with one opening being larger than the other. This unique shape permits other molecules to enter the large opening, but prevents them from passing completely through because of the small opening. Not only is the shape like a torus, but the inside of this torus also has a weak negative charge that attracts guest molecules through weak Van der Waals forces. These forces help to contain the guest molecule, and only with additional force such as heat, vibration or chemical reaction can the guest molecule be removed.

Most guest molecules are captured individually on a 1 to 1 ratio, although some cyclodextrin molecules can hold more than one small guest molecule. Also, some large guest molecules can be captured by more than one cyclodextrin molecule.

Another unique aspect of the cyclodextrin molecules is that, due to the secondary hydroxyl groups located on the wide edge of the ring and the primary hydroxyls on the narrow edge of the ring while the apolar hydrogens and the ether-like oxygens are at the inside of this torus, the exterior is hydrophilic while the cavity is hydrophobic. If a guest molecule of water is captured by the cyclodextrin molecule, then the complex molecule becomes more hydrophilic. If another guest molecule replaces the water molecule, the ensuing molecule will be either more or less hydrophilic depending on its degree of hydrophilic or hydrophobic nature.

Heat works in two ways with the complexing of a guest molecule to a cyclodextrin molecule. While heat does increase the reactivity between the two molecules, it also weakens the Van der Waals forces which then breaks the physical bond between the cyclodextrin molecule and the guest molecule thus releasing the guest molecule. Temperatures need to be controlled to obtain the best complexing of the two molecules.

When a guest molecule complexes with a cyclodextrin molecule, there is only a physical attraction (i.e., Van der Waals forces). No covalent bonds are broken or formed during formation of the inclusion complex. The main driving force of complex formation is the release of enthalpy-rich water molecules from the cavity. Water molecules are displaced by more hydrophobic guest molecules present in the solution to attain an apolar-apolar association and decrease of cyclodextrin ring strain resulting in a more stable lower energy state. These physical attractions occur whether the cyclodextrin is in solid form or is dissolved. In the solid form, only the surface molecules can complex but in solution all the cyclodextrin molecules are available for complexing.

All three (3) natural cyclodextrins (alpha, beta, and gamma) have been examined and may be employed in the composition of the present disclosure. The alpha cyclodextrin has a water solubility of approximately 14.5% at 25° C. and the gamma cyclodextrin has a solubility of approximately 23.2% at 25° C. The complexes of either of the alpha or gamma cyclodextrin tend to remain more soluble in the cyclodextrin/water solution and tend to remain suspended. The approximately 1.85% soluble beta cyclodextrin solution tends to precipitate a cyclodextrin complex much faster. As such, the use of beta cyclodextrin in the composition is preferred.

The preservative may be any ingredient that militates against a degradation or decomposition of the cyclodextrin during use. An excess of the preservative is typically employed in the aqueous solution to minimize the cyclodextrin degradation. As a nonlimiting example, the preservative is sodium benzoate. As another nonlimiting example, the preservative is ascorbic acid. One of ordinary skill in the art may select other suitable preservatives, as desired.

In a particular embodiment, the aqueous solution may be formed by admixing 5 to 50 parts beta cyclodextrin with water and an excess of the preservative. The beta cyclodextrin, at 25° C. is soluble to about 1.85%. It is believed that the cyclodextrin becomes available in capturing airborne contaminants when dissolved in the water. When it comes into contact with many airborne contaminants, the beta cyclodextrin complexes with these contaminants. The complexes of interest become insoluble and drop out of solution. The insoluble complex can then be removed to a safe area and the contaminants separated and removed.

In operation, the aqueous cyclodextrin solution of the present disclosure can advantageously be used to scrub airborne contaminants such as AMAH from an air stream, trapping the contaminants in the cyclodextrin. The cleaned air can then be recycled into the plant or exhausted from the plant without harming the environment. The cyclodextrin-AMAH complex can then be moved to a place where they can be separated by heat, by strong vibration or by strong agitation, and disposed of without harming personnel or plant.

Lab tests have shown that the complex formed between AMAH and beta cyclodextrin is a weak one that is easily broken by strong vibrations, strong or high shear agitation or heat.

With renewed reference to FIG. 1, a system for abatement of airborne contaminants such as AMAH from an air stream is shown. A source of contaminated air 1, for example, an indoor atmosphere of a manufacturing facility where styrene is used or generated, is provided. A blower 2 in communication with the contaminated air 1 generates a contaminated air stream 3 to a low shear fluid mixer 4.

The low shear fluid mixer 4 is also in communication with a source of the abatement composition 8, for example, the settling tank 9 or the separator 11. Another holding tank (not shown) for storage and delivery of the abatement composition 8 may also be employed, as desired. The low shear fluid mixer 4 blends the contaminated air stream 3 with the abatement composition 8 using low shear laminar flow. Without being bound by any particular theory, it is believed that the laminar flow facilitates a rapid complexing of the cyclodextrin of the abatement composition 8 with the contaminants of the contaminated air stream 3.

Figure 3:
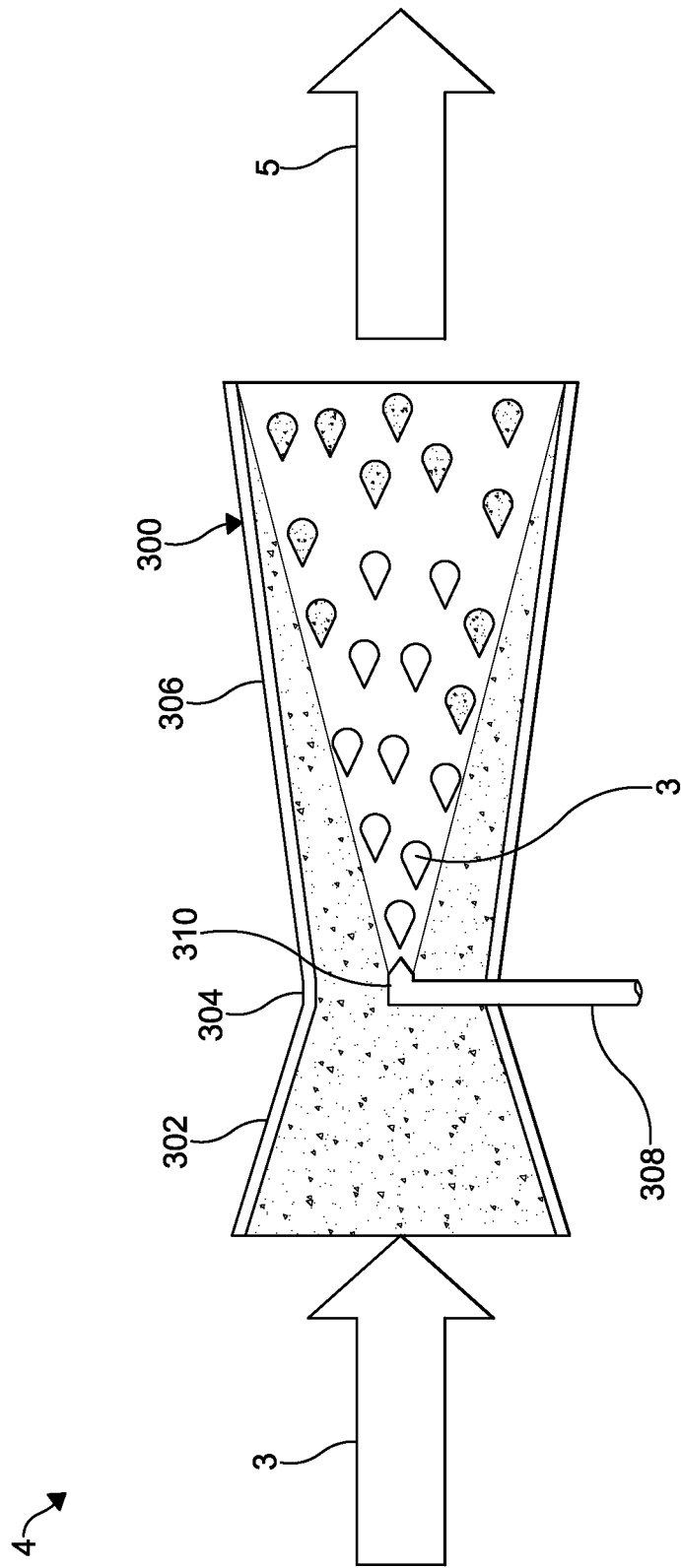
FIG. 3 is a schematic illustration of one type of low shear mixer suitable for use with the system and method of the present disclosure.

In the particular embodiment, the low shear fluid mixer 4 is a venturi mixer or scrubber. As illustrated in FIG. 3, the venturi mixer may have a main body 300 with a converging section 302, a throat section 304, and a diverging section 306. The throat section 304 has a smaller internal diameter than the converging section 302 and the diverging section 306. The venturi mixer may further have at least one liquid inlet 308 with a nozzle 310 through which the abatement composition 8 is introduced into the venturi mixer and proceeds through the venturi mixer together with the air stream 3. The abatement composition 8 may be sprayed into the venturi mixer, or may be pulled into the venturi mixer through entrainment principles, for example, creating laminar flow and very low shear conditions. The nozzle 310 may be in the throat section 304, as shown in FIG. 3, or alternatively may be placed before the converging section 302.

The air stream 3 enters through an inlet of the converging section 302 and, as the area decreases, gas velocity increases in accordance with the Bernoulli equation. The abatement composition 8 is introduced and atomizes or otherwise produces very tiny droplets. The low shear gas removal occurs in the throat section 304 as the air stream 3 mixes under low shear with the fog of tiny liquid droplets of the abatement composition 8. The rapid complexing of the cyclodextrin of the abatement composition 8 then occurs with the contaminants of the contaminated air stream 3, and the complexed or blended stream 5 of cyclodextrin and a complex of cyclodextrin and a contaminant exits through an outlet of the diverging section 306.

Although the low shear fluid mixer 4 is described as a venturi mixer hereinabove, it should be understood that other suitable low shear fluid mixers may also be used within the scope of the present disclosure. As a particular nonlimiting example, a laminar flow static mixer, also known as a motionless or in-line mixer, in which the abatement composition and contaminated air stream are pumped through a pipe containing stationary blades, may be used as the low shear fluid mixer 4.

The blended stream 5 of air, cyclodextrin, and a complex of cyclodextrin and the contaminant is then delivered from the low shear fluid mixer 4 to a collector 6. In FIG. 1, the collector 6 is a cyclone collector. The collector 6 is configured to separate the air in the blended stream from the cyclodextrin and complexed contaminant. For example, the clean dewatered air 7 may be expelled from the collector 6 back into the environment from which the contaminated air 1 originated.

Following the separation of the cleaned air 7 from the cyclodextrin and complexed contaminant in the collector 6, the cyclodextrin and complexed contaminant is collected as contaminant concentrate 10 in a settling tank 9. The cyclodextrin and complexed contaminant of the contaminant concentrate 10 may subsequently be removed, for example, by combustion, or be transported off premises for proper disposal.

In an exemplary embodiment illustrated in FIG. 1, the contaminant concentrate 10 including the cyclodextrin and complexed contaminant may be delivered to a high shear separator 11. The high shear separator 11 employs high shear agitation to cause the contaminant to decomplex from the cyclodextrin for collection. The level of high shear agitation is selected to cause the contaminant to decomplex. It should be understood that varying levels of high shear agitation may be necessary to cause different types of contaminants to complex. In this regard, it is also envisioned that different levels of high shear agitation may be employed to preferentially cause one type of contaminant to decomplex over another.

It should be understood that the use of high shear agitation may be preferable over the use of heat for decomplexing the contaminant. Heat may undesirably cause a rapid vaporization of the contaminant back into the atmosphere prior to collection. Heat also tends to degrade the cyclodextrin more rapidly, which is of particular concern where it is desired to recycle the cyclodextrin in the process for further abatement of airborne contaminants.

Figure 4:
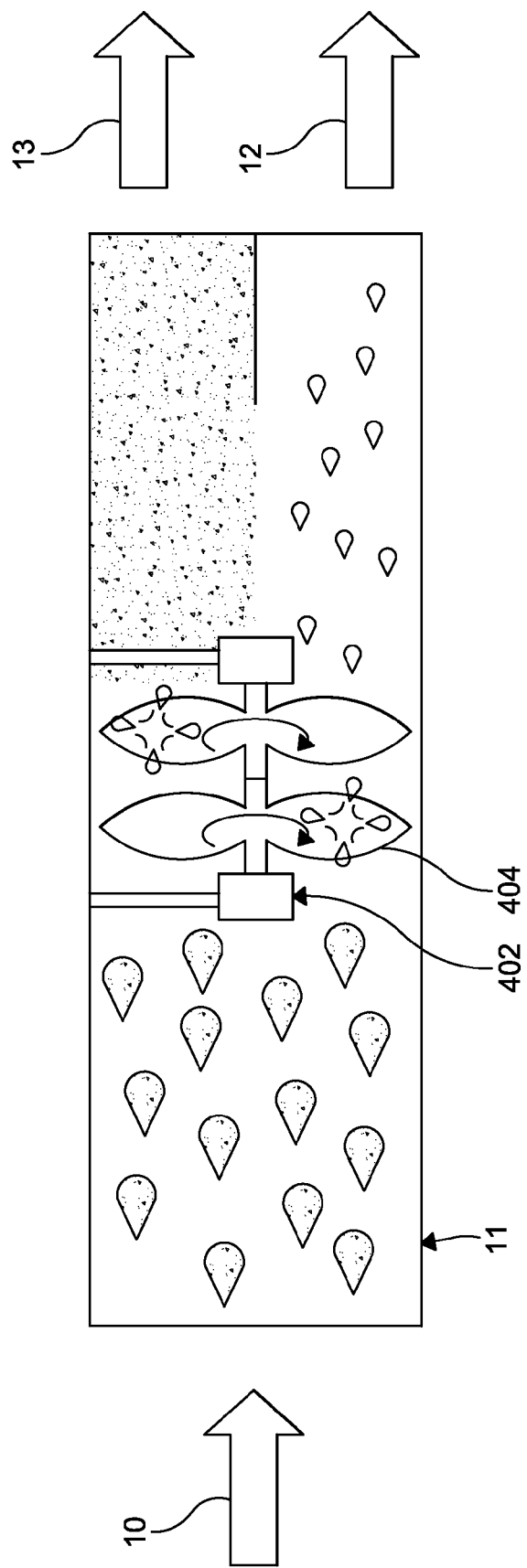
FIG. 4 is a schematic illustration of one type of high shear separator suitable for use with the system and method of the present disclosure.

In a particular embodiment shown in FIG. 4, the high shear separator 11 involves the use of a blade separator. Blade separators can be of two types: chevron or impingement. In the chevron separator (not shown), air passes between the blades and is forced to travel in a zigzag pattern. The liquid droplets of the contaminate concentrate 10 cannot follow the air streamlines, so they impinge on the blade surfaces. Special features such as hooks and pockets can be added to the sides of these blades to help improve droplet capture. Chevron grids can be stacked or angled on top of one another to provide a series of separation stages.

Impingement separators, as shown in FIG. 4 and being similar in shape to the common house fan, create a cyclonic motion. The impingement separator may have a main body 400 with an internal blade assembly 402 that is motorized and configured to rotate at very high speeds. The internal blade assembly 402 includes a plurality of curved blades 404, for example. As air passes over the curved blades, they impart a spinning motion that causes the mist droplets of the contaminant concentrate 10 to be directed to and impinge upon the vessel walls, as well as the blades themselves. This high shear impingement causes the contaminant to decomplexed from the cyclodextrin for collection. The impingement separator also may include internal baffles which provide additional surfaces for impingement and high shear decomplexing to occur, as desired.

Although the high shear separator 11 is described as a blade separator hereinabove, it should be understood that other suitable high shear separators such as high pressure sprayers may also be used within the scope of the present disclosure.

The decomplexed contaminant 13 is then delivered to a storage container 14 for disposal or reuse, as desired. Likewise, the decomplexed cyclodextrin solution 12 may be recycled and reintroduced to the low shear fluid mixer 4 for further abatement of airborne contaminants, as desired.

The present disclosure further includes a method for abatement of airborne contaminants, as illustrated in FIG. 2 The method includes a step 100 of providing a contaminated air stream. The contaminated air stream is then introduced in a step 102 to an aqueous solution of cyclodextrin and a preservative as described herein. The blending of the contaminated air stream with the aqueous solution is performed under low shear, and preferably with laminar flow, in order to facilitate a complexing of the cyclodextrin with airborne contaminants such as styrene.

The complexed cyclodextrin-guest (contaminant) is then collected in a step 104. In a step 106, the cyclodextrin is then separated from the guest, preferably using high shear agitation. Subsequent to the separating of the guest from the cyclodextrin, the cyclodextrin may be collected in a step 108, and recirculated for use in step 102. Likewise, the guest or contaminant may be collected in a step 110 for purposes of disposal or reuse.

EXPERIMENTAL

Laboratory tests have shown that over 90% of the quantities of airborne aromatic hydrocarbons could be removed from the contaminated air in a plant, returning the cleaned air back to the plant floor, and then separating the contaminant such as an aromatic hydrocarbon (guest) from the cyclodextrin. The guest could then be collected for reuse or incinerated, and the cyclodextrin solution would be returned for reuse.

These tests have shown that the Van der Waals force causing the guest to be held by the cyclodextrin molecule are quite fragile and easily broken by a shear force such as produced by a Warring Blender or a high pressure sprayer. Of the various means of introducing the cyclodextrin solution into the air stream only two (2) are efficient at removing 90% or more. They are micro fine bubbling of the air through the cyclodextrin and atomizing the cyclodextrin gently into the air stream using a venturi mixer (i.e., a small carburetor).

With respect to micro fine bubbling of air, the concept has been verified in the laboratory using a cyclodextrin solution to remove airborne AMAH. Samples of 3 different cyclodextrin from Wacker Chemie were received. They were labeled Cavamax W6 (alpha), Cavamax W7 (beta), and Cavamax W8 (gamma). Solutions of each cyclodextrin was made using 95% water and 5% cyclodextrin. These solutions were allowed to sit to allow the solutions to clear. Test tubes were prepared by placing 10 ml of each cyclodextrin solution and one (1) drop of each solvent (benzene, toluene, xylene, styrene acetone, methanol, ethanol, isopropanol, hexane, and pentane) was then placed into these test tubes. The results are shown in the following TABLE 1.

TABLE 1

Cyclodextrin complexing with volatile organic compounds.

| Contaminant | W6 | W7 | W8 |
| --- | --- | --- | --- |
| benzene | Precipitate | Precipitate | Precipitate |
| toluene | Precipitate | Precipitate | Precipitate |
| xylene | Precipitate | Precipitate | Precipitate |
| styrene | Precipitate | Precipitate | Precipitate |
| acetone | None | None | None |
| methanol | None | None | None |
| ethanol | None | None | None |
| isopropanol | None | None | None |
| heptane | None | None | None |
| pentane | None | None | None |
| methylene chloride | Precipitate | Precipitate | Precipitate |
| chloroform | Precipitate | Precipitate | Precipitate |
| 1,2 dichloroethane | Precipitate | Precipitate | Precipitate |

The above tests confirmed that cyclodextrin would complex with various mono aromatic hydrocarbons in the liquid form.

An additional series was run as follows. A small air pump was attached to a 250 ml flask using a flexible hose and a 2 holed rubber stopper. In the flask was a 20 ml quantity 1st of benzene, 2nd of toluene, 3rd of xylene, and 4th of styrene. The 2nd hole of the rubber stopper was connected with a flexible hose to a 250 ml beaker containing solutions of the different cyclodextrins. A bubbling tube from the second 2 hole stopper was run to the bottom of the beaker. All 4 of the AMAH precipitated in each of the 3 cyclodextrin solutions. The alpha solution and the gamma solution tended to hold the precipitate in solution. In the beta cyclodextrin, the precipitate dropped to the bottom. Since the beta cyclodextrin (Cavamax W7) worked the best at capturing the AMAHs it was decided to further the work only on the beta cyclodextrin. Also since the regulations for the Composites Industry are under attack to reduce styrene emissions, the lab work concentrated on it (styrene).

It is believed that the venturi mixer is at present the preferable system for handling large quantities of contaminated air (e.g., over 50,000 CFM). The venturi mixer works by siphoning the cyclodextrin solution into the air stream and at the same time atomizing and completely dispersing it. The mixture then by traveling in the same direction under laminar flow, has time for the cyclodextrin to attract and hold the guest molecule. Each cyclodextrin molecule will hold one guest molecule.

The next step is a cyclone collector used to remove the cyclodextrin/guest solution from the air stream. The air stream is then dewatered and vented back into the room. The cyclodextrin/guest solution is collected allowing the cyclodextrin/guest precipitate to settle to the bottom of the cyclodextrin solution.

The cyclodextrin solution and cyclodextrin/guest precipitates are then sent to a centrifugal separator where the cyclodextrin solution is separated from the cyclodextrin/guest. The cyclodextrin solution is returned for reuse. The cyclodextrin/guest is then sent to a high shear agitator. The high shear agitator causes the complex between the cyclodextrin and the guest to temporarily break. The mixture is then sent through a centrifugal separator removing the guest before it can recomplex with the cyclodextrin. The guest is stored and the cyclodextrin is returned for reuse.

Experiment #1

A venturi mixer is needed to handle the cyclodextrin solution complexes without damaging the bond when cleaning large volumes (over 50,000 CFM) of air.

Tests have been run proving this system is able to produce clean air containing 27 PPM of styrene from contaminated air with 300 PPM styrene. A saturated solution (1.87% Beta Cyclodextrin) which contained excess (5%) cyclodextrin was aspirated through a Mikuni Corp. carburetor (representing a venturi mixer) with 80 CFM of styrene contaminated air. An HNU portable photo-ionizer was used to determine the styrene levels of the air both before and after the cleaning. Plastic bags were used and filled with air both before and after the cleaning and used with the photo-ionizer. The 5 tests were run and all reduced the styrene level from 300 PPM to 27 PPM.

Advantageously, the system and method of the present disclosure employs laminar flow and low shear mixing of the composition with the air stream to complex the cyclodextrin with airborne contaminants. This is particularly effective and preferred in comparison to counter-flow cleaning of the air, which in testing has been shown to be 80 to 90% less effective at removing the aromatics due to the turbulence, counter-flow and shear of the cyclodextrin droplets coming from the sprinkler head. With the venturi mixer of the present disclosure, in particular, the cyclodextrin solution is atomized and then introduced into the air stream and flowing in the same direction, allowing the Van der Waals forces to pull the aromatic hydrocarbons to the cyclodextrin rather than fighting these forces.

Experiment #2

High-shear agitation is one of two effective means of releasing guests from cyclodextrin. Heat is the other.

Testing was run to determine the most effective method of releasing organic agents complexed with cyclodextrins. An evaluation of solutions containing complexed cyclodextrins were run using heat, ultrasonic vibrations, high energy electric discharge, room temperature evaporation, agitation, and high-shear agitation.

Heat: A beaker was filled with water and heated to boiling. A test tube containing the cyclodextrin solution with about 1 inch of the bottom containing the cyclodextrin/guest precipitate (styrene used). The styrene started to immediately rise to the surface as a clear liquid with a strong styrene smell. The styrene was easily separated using a decanting procedure.

Ultrasonic vibration: A Cole Palmer B3-R ultrasonic bath was filled with the cyclodextrin solution containing a large quantity of cyclodextrin/guest precipitate. The ultrasonic bath was turned on. The HNU portable photo-ionizer was used to measure the exiting of styrene both before the unit was turned on and again after it was turned on. The reading before being turned on read 5 PPM styrene, and after it was turned on read 7 to 10 PPM styrene. Poor bond breakage was observed.

High energy electric discharge: A grid was wired to an Ionic Breeze Quadra S1637 unit. A cyclodextrin solution containing cyclodextrin/guest precipitate was poured over the grid. No change in the quantity of styrene emissions were detected.

High shear agitation: First a cyclodextrin solution containing cyclodextrin/guest was placed in an Osterizer Classic mixer. The unit was turned on to puree. Strong odors of styrene were detected. Measurements over 100 PPM of styrene were found. The unit was then set to on and the styrene emission increased to 125 PPM. A further study was then run then using an IKA T-18 Basic emulsifier at 18,000 RPM with a cyclodextrin solution containing a large quantity of cyclodextrin/guest precipitate. The precipitate immediately rose to the surface, was very oily, and gave off a strong (over 100 PPM) styrene smell. When the unit was turned off the oily surface remained for about 1 to 2 minutes and then reverted to a cyclodextrin/guest precipitate on the bottom of the beaker.

Distillation: A distillation test was also performed, and it was found that the guest (e.g., styrene) can be completely distilled at the boiling temperature of water (100° C.) when an excess of water is present. The starting solution was 160 grams of water, 150 grams of cyclodextrin, and 10 grams of styrene. The styrene distilled off at a ratio of 1 part of styrene to 4 parts water.

While certain representative embodiments and details have been shown for purposes of illustrating the invention, it will be apparent to those skilled in the art that various changes may be made without departing from the scope of the disclosure, which is further described in the following appended claims.

What is claimed is:

1. A system for abatement of airborne contaminants, comprising:
    a low shear fluid mixer in communication with a contaminated air stream and an abatement composition stream, the fluid mixer configured to mix the contaminated air stream and the abatement composition stream using laminar flow, the abatement composition stream comprising an aqueous solution of cyclodextrin and a preservative, the abatement composition stream configured to complex with and remove a contaminant from the contaminated air stream to provide a cleaned air stream; and
    a collector in communication with the fluid mixer, the collector configured to separate the cleaned air stream from the abatement composition stream following the removal of the contaminant by the abatement composition stream.

2. The system of claim 1, wherein the low shear fluid mixer is a venturi mixer.

3. The system of claim 2, wherein the venturi mixer has a main body with a converging section, a throat section, and a diverging section.

4. The system of claim 3, wherein the venturi mixer has a liquid inlet disposed through the main body with a nozzle adjacent the throat section, the nozzle configured to atomize the abatement composition stream upon introduction of the abatement composition stream to the venturi mixer.

5. The system of claim 1, wherein the collector is a cyclone collector configured to expel the clean air stream to the atmosphere.

6. The system of claim 1, further comprising a blower for pulling the contaminated air stream from an interior of a building and introducing the contaminated air stream to the low shear fluid mixer.

7. The system of claim 1, wherein the preservative of the abatement composition stream is one of sodium benzoate and ascorbic acid.

8. The system of claim 1, wherein the cyclodextrin of the abatement composition stream is beta cyclodextrin.

9. The system of claim 1, wherein the abatement composition stream comprises 5 to 50 parts beta cyclodextrin in water with an excess of the preservative.

10. The system of claim 9, wherein the abatement composition stream, consists essentially of 5 to 50 parts beta cyclodextrin in water with an excess of the preservative.

11. The system of claim 10, wherein the abatement composition stream consists of 5 to 50 parts beta cyclodextrin in water with an excess of the preservative.

12. The system of claim 1, further comprising a high shear separator in communication with the collector and configured to separate the contaminant from the abatement composition stream.

13. The system of claim 12, wherein the high shear separator is a blade separator.

14. The system of claim 13, wherein the blade separator has a main body with an internal blade assembly that is motorized and includes a plurality of curved blades configured to rotate at high speeds.

15. The system of claim 12, wherein the high shear separator is in communication with a storage container for storage of the contaminant separated from the abatement composition stream.

16. The system of claim 12, further comprising a settling tank in communication with the collector, the low shear fluid mixer, and the high shear separator.

17. The system of claim 16, wherein the settling tank is configured to configured to receive a contaminant concentrate including the abatement composition stream with the contaminant from the collector, deliver the abatement composition stream to the low shear fluid mixer, deliver the contaminant concentrate to the high shear separator, and receive the abatement composition stream without the contaminant from the high shear separator.

18. A system for abatement of airborne contaminants, comprising:
- a blower for pulling a contaminated air stream from an interior of a building;
- a low shear fluid mixer in communication with the blower and receiving the contaminated air stream and an abatement composition stream, the fluid mixer configured to mix the contaminated air stream and the abatement composition stream using laminar flow, the abatement composition stream comprising an aqueous solution of cyclodextrin and a preservative, the abatement composition stream configured to complex with and remove a contaminant from the contaminated air stream to provide a cleaned air stream, wherein the low shear fluid mixer is a venturi mixer;
- a collector in communication with the low shear fluid mixer, the collector configured to separate the cleaned air stream from the abatement composition stream following the removal of the contaminant by the abatement composition stream, wherein the collector is a cyclone collector configured to expel the clean air stream to the atmosphere;
- a settling tank in communication with the collector and configured to receive a contaminant concentrate including the abatement composition stream with the contaminant from the collector;
- a high shear separator in communication with the settling tank and configured to separate the contaminant from the abatement composition stream and return the abatement composition stream to the settling tank, wherein the high shear separator is a blade separator, the low shear fluid mixer further in communication with the settling tank and configured to receive the abatement composition stream from the settling tank; and
- a storage container in communication with the high shear separator and configured to receive the contaminant separated from the abatement composition stream for storage of the contaminant.

19. A method for abatement of airborne contaminants, comprising the steps of:
- providing a contaminated air stream;
- introducing an abatement composition stream to the contaminated air stream under low shear conditions, the abatement composition stream mixing with the contaminated air stream using laminar flow, the abatement composition stream comprising an aqueous solution of cyclodextrin and a preservative, the abatement composition stream configured to complex with and remove a contaminant from the contaminated air stream to provide a cleaned air stream;
- subsequent to the mixing of the abatement composition stream with the contaminated air stream, separating the clean air stream from the abatement composition stream; and
- collecting the abatement composition stream having the contaminant.

20. The method of claim 19, further comprising the step of separating the contaminant from the abatement composition stream with high shear agitation.

* * * * *